Jan. 18, 1949.  E. L. TEBBETTS  2,459,471
CRANBERRY PICKING MACHINE
Filed Dec. 19, 1946  2 Sheets-Sheet 1
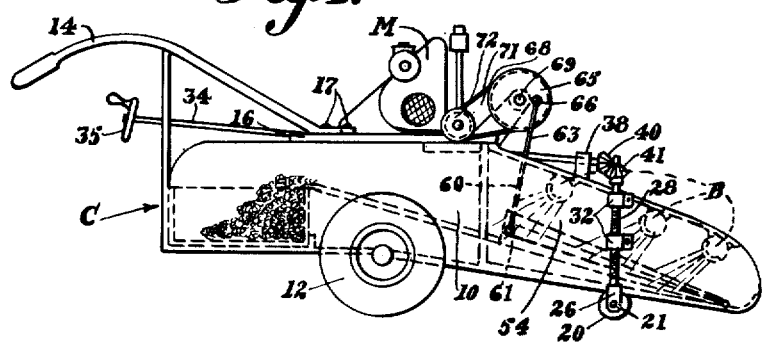
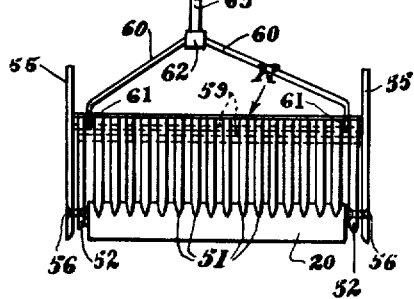
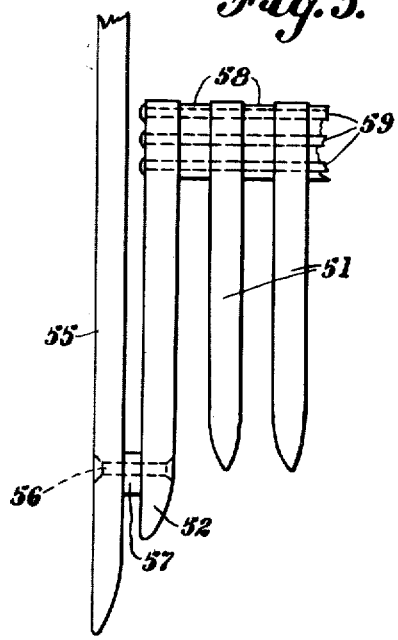
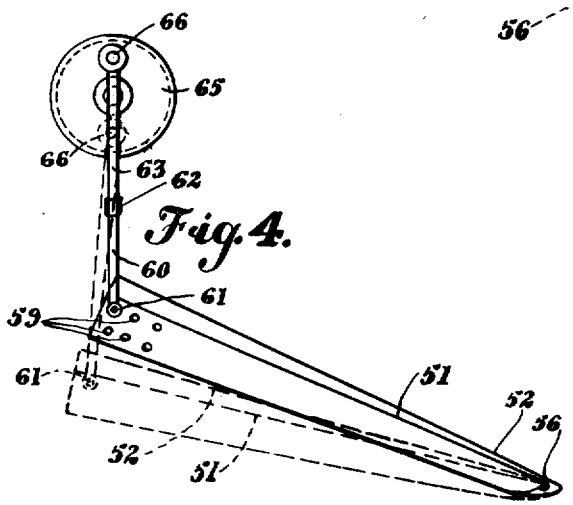
INVENTOR.
Eugene L. Tebbetts
BY Harold E. Cole
Attorney

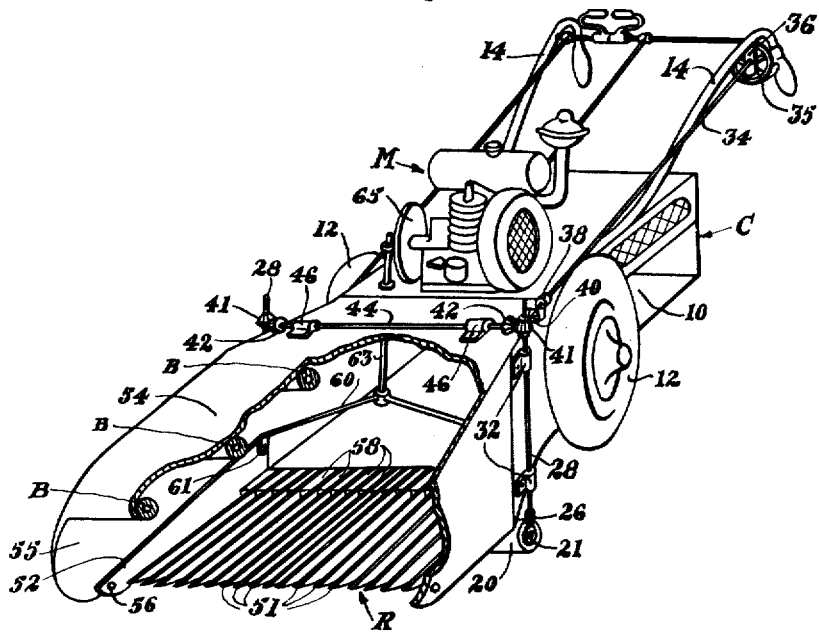
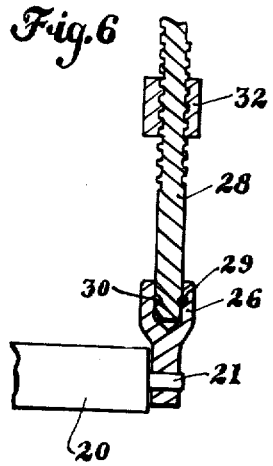

Patented Jan. 18, 1949

2,459,471

UNITED STATES PATENT OFFICE 2,459,471

CRANBERRY PICKING MACHINE

Eugene L. Tebbetts, Holliston, Mass., assignor of one-half to Harold E. Cole, Boston, Mass.

Application December 19, 1946, Serial No. 717,217

7 Claims. (Cl. 56—328)

This invention relates to a cranberry picking machine.

The principal object of my invention is to provide a machine that strips cranberries off the vines efficiently by scoop and rake mechanism.

Another object is to provide such a machine that is moderate in cost and simple to operate so that the small cranberry raisers, as well as the large ones, can have my machine, thus eliminate the arduous labor of hand picking.

At the present time a hand scoop with long teeth is commonly used to pick cranberries. This is laborious and slow; although it is practical in that it strips the berries from the vines fairly satisfactorily. It is my purpose to obtain the advantages of picking berries with said hand scoop by a machine that incorporates the best functional features of hand scooping operations with improvements while speeding up the picking operation and eliminating hand labor.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a side elevational view of my cranberry picking machine.

Figure 2 is a front elevational view of the front part of my machine, showing the rake in raised position.

Figure 3 is an enlarged fragmentary top plan view of the scoop and rake portion of my machine.

Figure 4 is an enlarged, side elevational view of the apparatus to actuate the rake, also showing part of the scoop and rake, the dash lines indicating the changed position of certain parts during actuation.

Figure 5 is a perspective view of my machine with the top cover of the scoop broken away.

Figure 6 is an enlarged, fragmentary, longitudinal sectional view of part of the mechanism for raising and lowering the vine holding roller.

As illustrated, I show my machine in the form of a vehicle, which carries the picking apparatus, the chassis C of which has a body or supporting frame 10 to which wheels 12 of the usual type are attached. My vehicle is guided by the handles 14 attached to the top 16 of said body 10 by bolts 17. A motor M, such as the well known gasoline type, propels my machine, said motor being supported by said body top 16.

My machine is preferably provided with a vine-holding roller 20 below a scoop 54, later described. This roller helps strip, and holds the cranberry vines while a rake strips the cranberries therefrom, so the roots of the vines will not be torn from the ground. It is rotatably mounted on two stub shafts 21 at opposite ends thereof. To raise or lower said roller as desired during the picking operation of my machine I provide mechanism embodying swivel members 26 attached to said stub shafts 21. Adjusting screws 28 of the lead screw type extending upwardly at opposite sides of said roller, turn loosely or swivel in said swivel members 26, being movably held therein by pins 29 extending into grooves 30 made in said adjusting screws 28 to permit rotation of the latter.

Attached to said body 10 at opposite sides are two supporting brackets 32, interiorly screw-threaded through which said adjusting screws pass and screw-threadedly connect as shown.

A long control rod 34 has a hand wheel 35 attached to its outside end. Said rod 34 is rotatable in a bearing 36 attached to one said handle 14. Said control rod 34 loosely passes through a supporting member 38 attached to said body 10. A miter gear 40 is on one end of said rod 34 and it meshes with a miter gear 41 on one end of said screw 28, which gear 41 in turn meshes with one of two miter gears 42 which are mounted on opposite ends of a cross rod 44 that is rotatably supported by two supporting members 46 attached to said body 10. Rotation of said hand wheel 35 rotates said miter gear 40 and the four gears 41 and 42, which in turn rotate both said adjusting screws 28, thus raising said roller 20 up or down, as desired.

At the forward end of my machine and supported by said body 10, is a scoop 54 which has a rake portion R, movement of which rake strips the cranberries from the vines. Said rake has teeth 51, spaced apart less than the diameter or width of the cranberries to be picked. These teeth 51 may be twenty-six inches long, for instance, although the length may be varied. Said rake R has an outside tooth 52 at each side thereof which preferably is longer than said intermediate teeth 51. Said teeth 52 are pivotally fastened by pins 56 to the stationary sides 55 of said scoop 54. The tip ends of said intermediate teeth 51 preferably terminate laterally opposite said pins 56 since it is desired that said tip ends maintain a predetermined position at their front end during the picking operation at a point where they can most efficiently penetrate the cranberry vines.

Spacer members 57 space each said outside tooth 52 from said scoop sides 55. Also spacer members 58 space said intermediate teeth 51 apart. Long pins 59 extend through said outside teeth 52, said spacers 58 and said intermediate teeth 51, being headed over outside of said teeth 52. As shown in said Figure 4 there are two rows of said pins. Said pins 59 thus connect all of said teeth together at the rear half portion of said rake R.

Certain portions of said rake R are raised and lowered by means of mechanism having forked portions 60 which are fastened by pins 61 to the rear end portion of outside teeth 52. Said forked portions are connected together and to a vertical rod 63 by a connector member 62. Said rod 63 is attached to an eccentric wheel 65 by a pin 66. Said wheel 65 is supported by a stand 68 mounted on the body top 16. A shaft 69 rotatably supported by said stand 68 is rotated by a belt 71 mounted on a pulley 72 that is driven by the shaft of said motor M.

Said scoop 54 may be provided with air ports or apertures B through which air under pressure may pass to blow the cranberries rearwardly into a container C carried by my machine.

As my machine mover over a cranberry bog the motor M rotates said eccentric wheel 65 which raises and lowers said outside teeth 52 which in turn raises and lowers said intermediate teeth 51 except their tip ends. Since said outside teeth 52 are pivotally fastened as at 56 to the stationary scoop 54 at their lower ends merely pivotally move, hence the lower ends of said intermediate teeth 51 do not move, but hold their position. Thus they penetrate the cranberry vines at substantially the same level below the cranberries during the operation of my machine. The portions of said intermediate teeth as well as said outside teeth 52, between said pin 56 and pins 59 are vigorously moved upwardly and downwardly to thus strip the cranberries from the vines.

Said roller 20 is especially useful where the vines are thick or if they get tangled in the rake, since it holds them during the stripping operation of the rake, thus keeping the vines from being uprooted should the movement of said rake R be sufficiently forceful to otherwise do this. Said roller also helps strip the cranberries from the vines.

While my machine is especially adaptable for cranberry picking it could be used to pick other berries and similar products, hence its application is not confined to cranberries.

Said teeth 51 and 52 are of substantial thickness (top to bottom), as four inches at their rear portions, and they preferably taper in thickness toward their front ends, as shown in said Figure 4.

Said wheels 12 are purposely so positioned that they follow directly in the path of said rake R so that no unpicked vines will be run over by them. This is accomplished by making said chassis C, rearwardly of said scoop, narrower than said rake R as shown on said Figure 5.

What I claim is:

1. A machine of the class described comprising supporting means, a scoop supported by said means embodying sides and a rake having two teeth at opposite outer sides of said rake, connecting means pivotally attaching said two teeth at their front half portions to said scoop sides, said rake having a plurality of teeth intermediate said side teeth connected to said side teeth at their rear half portions and being free and terminating at their front ends substantially laterally opposite said connecting means, said side teeth extending farther forward than said intermediate teeth, and movable mechanism connected to said side teeth at their rear ends upon actuation to raise and lower said side and intermediate teeth between the points where said side teeth are pivotally attached to said scoop sides and where they are connected to said intermediate teeth.

2. A machine of the class described comprising supporting means, a scoop supported by said means embodying sides and a rake having two teeth at opposite outer sides of said rake pivotally attached at their front end portions to said scoop sides, said rake having a plurality of teeth intermediate said side teeth connected to said side teeth at their rear half portions and being free at their front ends, said teeth extending farther forward than said intermediate teeth, and movable mechanism connected to said side teeth at their rear ends adapted upon actuation to raise and lower said side and intermediate teeth between the points where said side teeth are pivotally attached to said scoop sides and where they are connected to said intermediate teeth at their said rear portions, said scoop sides extending farther forward than said side teeth.

3. A machine of the class described comprising a vehicle, a scoop supported by said vehicle embodying sides and a rake intermediate said sides having two teeth at opposite outer sides of said rake, pin members pivotally attaching said two teeth at their front end portions to said scoop sides, said rake having a plurality of teeth intermediate said side teeth, a pin member fixedly connecting said intermediate and side teeth at their rear half portions together, the tip ends of said intermediate teeth being free and terminating substantially laterally opposite said first-mentioned pin members, said side teeth extending farther forward than said intermediate teeth, and movable mechanism connected to said side teeth at their rear ends adapted upon actuation to raise and lower intermediate portions of said side and intermediate teeth.

4. A machine of the class described comprising a vehicle, a scoop supported by said vehicle embodying sides and a rake intermediate said sides having two teeth at opposite outer sides of said rake, pin members pivotally attaching said two teeth at their front end portions to said scoop sides, said rake having a plurality of teeth intermediate said side teeth, spacer members between said teeth, pin members extending through said intermediate and side teeth at their rear half portions and said spacer members connecting them together, the tip ends of said intermediate teeth being free and terminating substantially laterally opposite said first-mentioned pin members, said side teeth extending farther forward than said intermediate teeth, and movable mechanism embodying an eccentric wheel connected to said side teeth at their rear end portions adapted upon actuation to raise and lower intermediate portions of said side and intermediate teeth.

5. A machine of the class described comprising a vehicle embodying a steering handle, a scoop supported by said vehicle embodying sides and a rake intermediate said sides having two teeth at opposite outer sides of said rake, pin members pivotally attaching said two teeth at their front end portions to said scoop sides, said rake having a plurality of teeth intermediate said side teeth, pin members fixedly connecting said intermediate and side teeth at their rear half portions together whereby the rear portion of said rake moves as a unit, the tip ends of said intermediate teeth being free and terminating substantially laterally opposite said first-mentioned pin members, said side teeth extending farther forward than said intermediate teeth, movable mechanism connected to said side teeth at their rear ends adapted upon actuation to raise and lower intermediate portions of said side and intermediate teeth, and a roller located under said rake at a point intermediate the forward and rear extremities thereof and supporting instrumentalities connecting said roller to said vehicle handle.

6. A machine of the class described comprising supporting means, a scoop supported by said means embodying a rake having two outside teeth at opposite sides and other teeth intermediate thereof, said outside teeth being pivotally attached to said scoop at their front half portions, all of said teeth being connected at their rear portions, and movable mechanism supported by said supporting means and operably connected to said outside teeth adapted upon actuation to raise and lower portions of said teeth, said intermediate teeth extending to a point approximately laterally opposite the points of attachment of said outside teeth to said scoop.

7. A machine of the class described comprising supporting means, a scoop supported by said means embodying a rake having two outside teeth at opposite sides and other teeth intermediate thereof, said outside teeth being pivotally attached to said scoop at their front half portions, all of said teeth being connected at their rear portions, and movable mechanism supported by said supporting means and operably connected to said outside teeth adapted upon actuation to raise and lower portions of said teeth, said intermediate teeth extending to a point approximately laterally opposite the points of attachment of said outside teeth to said scoop, said outside teeth extending forwardly farther than said intermediate teeth.

EUGENE L. TEBBETTS.

REFERENCES CITED

The following references are of record in the file of this patent:

UNITED STATES PATENTS

| Number | Name | Date |
| --- | --- | --- |
| 845,958 | Leidel | Mar. 5, 1907 |
| 1,454,071 | Owens | May 8, 1923 |
| 1,572,025 | Maglathlin | Feb. 9, 1926 |
| 1,907,467 | Tervo et al. | May 9, 1933 |
| 2,231,354 | Wilcox | Feb. 11, 1941 |
| 2,355,273 | Case | Aug. 8, 1944 |